United States Patent
Shankar et al.

[11] Patent Number: 5,140,525
[45] Date of Patent: Aug. 18, 1992

[54] UNIFIED SPACECRAFT ATTITUDE CONTROL SYSTEM

[75] Inventors: Uday J. Shankar, Plainsboro; Kidambi V. Raman, East Windsor, both of N.J.

[73] Assignee: General Electric Company, East Windsor, N.J.

[21] Appl. No.: 745,046

[22] Filed: Jul. 31, 1991

[51] Int. Cl.$^5$ .................................. B64G 1/26
[52] U.S. Cl. ..................... 364/459; 244/164; 244/171
[58] Field of Search ............... 364/434, 459; 244/158 R, 164, 169, 172, 3.21, 171

[56] References Cited

U.S. PATENT DOCUMENTS

| | | | |
|---|---|---|---|
| 3,866,025 | 2/1975 | Cavanagh | 364/459 |
| 4,537,375 | 8/1985 | Chan | 244/171 |
| 4,599,697 | 7/1986 | Chan et al. | 244/169 |
| 4,758,957 | 7/1988 | Hubert et al. | 364/459 |
| 4,961,551 | 10/1990 | Rosen | 244/164 |

Primary Examiner—Gary Chin
Attorney, Agent, or Firm—William H. Meise; Stephen A. Young; Clement A. Berard

[57] ABSTRACT

An attitude control system for a spacecraft includes sensors for generating attitude control signals and logic for producing torque demand signals in the form of a $T_d$ matrix. The thrusters are oriented in complementary pairs about the center of mass for, when energized, producing mutually opposite torques. Information about the location of thrusters and their thrusts may be represented by a pulse-width-to-torque transformation matrix C. A weighted pseudo inverse of C is precalculated as $$Q = WC(CWC)^- \qquad (13)$$

and is stored in memory associated with the flight computer, thereby avoiding the need for the flight computer to perform the intensive calculations of Q. Thruster pulsewidth for attitude control is easily calculated by the flight computer as $$\Delta_p = \tau_p Q T_d \qquad (14)$$

where $\tau_p$ is the control cycle time.

7 Claims, 3 Drawing Sheets

| MODE | NORTH | | EAST | | WEST | |
|---|---|---|---|---|---|---|
| | ODD | EVEN | ODD | EVEN | ODD | EVEN |
| A | YAW/ROLL | | PITCH | | | |
| B | YAW/ROLL | | | | | PITCH |
| C | YAW/ROLL | | PITCH | | PITCH | |
| D | YAW/ROLL | | | PITCH | | PITCH |
| E | ROLL | | YAW/PITCH | | | |
| F | ROLL | | | | YAW/PITCH | |
| G | ROLL | | YAW/PITCH | | YAW/PITCH | |
| H | ROLL | | | YAW/PITCH | | YAW/PITCH |
| I | ROLL | — | YAW/PITCH | | — | — |
| J | ROLL | — | — | — | YAW/PITCH | |
| K | — | ROLL | YAW/PITCH | | | |
| L | | ROLL | | | YAW/PITCH | |
| M | ROLL | | YAW/PITCH | | YAW/PITCH | |
| N | | ROLL | | YAW/PITCH | | YAW/PITCH |

| THRUSTER PAIR | PULSEWIDTH | SIGN | PULSE ASSIGNMENT |
|---|---|---|---|
| (1, 3) | $\Delta_p(1)$ | + | $\Delta_c(1)=\Delta_p(1)$ |
| | | − | $\Delta_c(3)=-\Delta_p(1)$ |
| (2, 4) | $\Delta_p(2)$ | + | $\Delta_c(2)=\Delta_p(2)$ |
| | | − | $\Delta_c(4)=-\Delta_p(2)$ |
| (5, 7) | $\Delta_p(3)$ | + | $\Delta_c(5)=\Delta_p(3)$ |
| | | − | $\Delta_c(7)=-\Delta_p(3)$ |
| (6, 8) | $\Delta_p(4)$ | + | $\Delta_c(6)=\Delta_p(4)$ |
| | | − | $\Delta_c(8)=-\Delta_p(4)$ |
| (9, 11) | $\Delta_p(5)$ | + | $\Delta_c(9)=\Delta_p(5)$ |
| | | − | $\Delta_c(11)=-\Delta_p(5)$ |
| (10, 12) | $\Delta_p(6)$ | + | $\Delta_c(10)=\Delta_p(6)$ |
| | | − | $\Delta_c(12)=-\Delta_p(6)$ |

*FIG. 4*

UNIFIED SPACECRAFT ATTITUDE CONTROL SYSTEM

BACKGROUND OF INVENTION

This invention relates to spacecraft attitude and stationkeeping control systems by the use of throttleable or pulse-modulated thrusters, and particularly to such systems in which unified thruster logic allows use of most of the remaining thrusters in the presence of a failure of a single one.

Spacecraft are widely used for communications, earth sensing and exploration, vehicle locating, and for surveillance. All of these uses require that the orientation of the spacecraft in space, and possibly its location or station, be accurately controlled. The spacecraft attitude may be controlled by magnetic torquers, by momentum or reaction wheels, or by the use of thrusters.

Since each spacecraft at launch has at least a slightly different configuration than other spacecraft, its thrusters will be placed at slightly different locations relative to the center of gravity than in other spacecraft. Also, the specific impulse characteristics of the thrusters may differ from one to the next. As propellant or other consumables are expended, the center of mass or gravity of the spacecraft may move. All of these effects contribute to variability in torque imparted by the various thrusters. As a consequence, the logic for controlling the thruster system is ordinarily custom-written for each spacecraft. During the construction phase for a spacecraft, it may be found to be necessary to alter the thruster configuration or characteristics, which may require costly rewriting of software.

Control arrangements ordinarily provide torques by preselected combinations of thrusters. The selected thrusters are ordinarily located on opposite sides of the center of gravity. When in orbit, a spacecraft thruster may fail or may have a significant change in specific impulse characteristics. When a thruster fails, those combinations of torque for which the failed thruster is an element cannot be used. This may adversely affect or limit control of the spacecraft.

On a geosynchronous satellite, the North (or South), East and West faces are ordinarily fitted with thruster arrays. For North-South (N-S) stationkeeping, North-face (or South-face) thrusters provide acceleration, and for East-West (E-W) stationkeeping, the East and West face thrusters provide acceleration. Attitude control is provided by operating various combinations of N, E and W thrusters to achieve the desired 3-axis torque. Prior art thruster control is ordinarily selected to provide redundancy in case of failure of a single thruster or of an entire half-system (odd or even). A half-system failure could result from failure of an element common to half the thrusters, as for example failure of a common manifold valve. Prior art controllers divide the operation into a plurality of "modes", each of which is treated separately and each of which is associated with a distinct, independent logic, in either hardware or software form. For reliability purposes, the thrusters are redundant, with odd and even thrusters connected to different propellant tanks.

In case of a failure of one of the thrusters, the corresponding half-system is ignored because of the complexity of the logic required to use the remaining operable thrusters. Use of only half the thruster system results in reduction in performance and reliability, additional use of fuel and reduced spacecraft lifetime.

A unified thruster control arrangement is described in copending U.S. patent application Ser. No. 07/552,638, filed Jul. 18, 1990 in the name of Paluszek et al. As described therein, spacecraft control is achieved by sensing the spacecraft attitude, and generating torque and force vectors T and F, respectively, which represent the forces and torques which the thrusters are to produce. Each of the torque and force vectors includes three mutually orthogonal components $T_1$, $T_2$ and $T_3$, and $F_1$, $F_2$ and $F_3$, respectively. Control is achieved by forming a plurality of difference equations having the form:

$$\Delta_i = F_i - \sum_{j=1}^{N} b_{ij}\alpha_j \quad (1)$$

and $$\Delta_{i+3} = T_i - \sum_{j=1}^{N} a_{ij}\alpha_j \quad (2)$$

where a and b are the maximum torque and force, respectively, which the $j^{th}$ thruster can produce, and o is the throttle setting of the $j^{th}$ thruster, which may take on values ranging from zero to unity. The difference signals $\Delta$ are summed to form a single scalar equation relating variable $\alpha$ to a scalar performance index Z. The single scalar equation is solved for that value of $\alpha_j$ which maximizes Z, and the thrusters are controlled in a manner directly related to the corresponding value of $\alpha_j$. This scheme is effective, but computationally intensive, and the flight computer must therefore have sufficient power to perform the abovementioned computations on an ongoing basis, together with other ordinary spacecraft control activities. The computational requirements result in a slowing of the control response time, or impose a requirement for a high-speed or more complex computer.

A unified thruster control system is desired which reduces on-board computer computation.

DESCRIPTION OF THE DRAWING

FIG. 4 tabulates thruster pulsewidth assignments for attitude control using complementary thruster pairs.

DESCRIPTION OF THE INVENTION

Figures 1, 2:
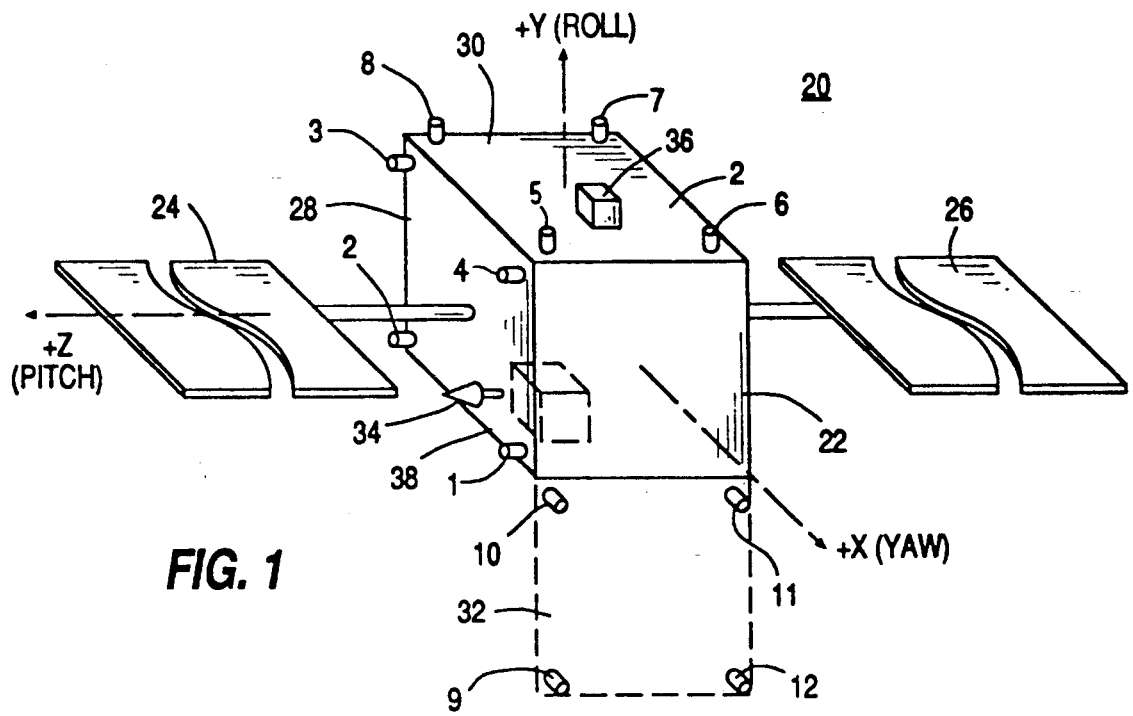
FIG. 1 is a view, in perspective or isometric form, of a simplified spacecraft according to the invention.
FIG. 2 tabulates various thruster operating modes for the arrangement of FIG. 1.

FIG. 2 illustrates a spacecraft having a layout of thrusters according to the prior art, but which is controlled in accordance with the invention. In FIG. 2, a spacecraft 20 having a body 22 includes a omnidirectional antenna illustrated as 34 which may be used for communication and command, and also includes attitude sensors for roll, pitch and yaw, which are illustrated together as a block 36. Roll (Y), pitch (Z) and yaw (X) axes are associated with spacecraft body 22. Attitude signals representative of roll, pitch and yaw are coupled (by means which are not illustrated) from sensors 36 to a controller illustrated as a block 38 for generating thruster control signals. Antenna 34 is coupled by way of a transceiver (not illustrated) to controller 38. A plurality of thrusters illustrated as 1-12 (where the hyphen represents the word "through") are associated with North face 28, East face 30, and West face 32 of spacecraft body 22 and are connected (by means not illustrated) to controller 18 for being controlled thereby. West face 32 is illustrated by dash lines in a developed view so that the locations of thrusters 9-12 may be seen.

FIG. 2 tabulates operating modes according to the invention for a spacecraft with a thruster layout such as that illustrated in FIG. 1. In FIG. 2, the various thruster combinations are designated by letters A through N. Each of the three major columns of FIG. 2 refers to the face (North, East or West) on which the thruster is located, and for each major column there are two subcolumns designated by the even or odd status of the thruster number. For each mode, a notation in a column or subcolumn indicates the axis of control (Yaw, Roll, Pitch) provided by the thrusters of the indicated column and subcolumn. For example, in mode A, all the North face thrusters (i.e. thrusters 1, 2, 3 and 4 of FIG. 1) may be used, singly or in combination, for roll or yaw, or a combination of roll and yaw control, while all the East face thrusters (5, 6, 7, 8) may be used, singly or in combination, for pitch control. Thus, in mode A, a combination such as thrusters 1 & 2 or 1 & 4 might be used for torque about both the roll (y) and yaw (x) axes), while torque about the pitch axis (z) would be provided by a combination such as thrusters 5 and 6 or 7 and 8. The operation of North-face thrusters also imparts an acceleration in the South direction, which may be advantageous for change in orbit inclination. The operation of East-face thrusters also imparts Westward acceleration. In the A mode, torque about the yaw axis alone might be provided by thrusters 1 and 2, or by thrusters 3 and 4. The acceleration resulting from operation of the various thrusters is taken into account when selecting a mode of operation for an attitude control maneuver. The A mode attitude control is used when all the North face and East face thrusters are operable, and a South acceleration is desired in conjunction with the yaw or roll control, and a Westward acceleration is desired in conjunction with pitch control. When all the thrusters are operable, but an Eastward acceleration is desired in conjunction with pitch control, the B mode is selected.

In general, torque about a single axis can be provided by any of several modes, and the selected mode depends upon the operational thruster availability and direction of stationkeeping adjustment. If a particular thruster is inoperative, the modes listed in FIG. 2 which include the inoperative thruster (and it complementary thruster) will be unavailable for use. For example, if thruster 6 is inoperative, those modes including East face even thruster 6 and its complement 8 are unavailable, namely modes A, D, E, H, I, K and N. However, modes B, C, F, G, L and M continue to be available, and these modes in combination fully utilize all operable thrusters except failed thruster 6 and its complement 8. This thruster availability allows torque and stationkeeping maneuvers which, in general, use less fuel than if all the even, or all of the odd thrusters were to be ignored upon the failure of a single thruster. Also, the failure of one even and one odd thruster, which in a prior art arrangement would result in complete failure by disabling both halves of the system, need not result in loss of control. For example, if thrusters 6 and 7 were to fail, the unavailable thrusters would be complementary thruster pairs 5, 7 and 6, 8, which are all the East-face thrusters. Referring to FIG. 2, this would still leave available modes B and L, either of which can provide full attitude control. The stationkeeping adjustments necessary to correct for accelerations imparted by modes B and L are made by use of the combinations of the remaining thrusters, as described below.

Naturally, if large numbers of even or odd thrusters become inoperative, the available control may degenerate toward one half-system, as for example mode to M, in which all the even thrusters are unavailable. Under such conditions, the cross-coupling of torques results in the same fuel usage as in the prior art. The difference between the invention and the prior art in this regard is that multiple thruster failures are required to reach this condition in the case of the invention, whereas the prior art requires only the failure of a single even thruster. Thus, the invention is more reliable than the prior art.

Figure 3:
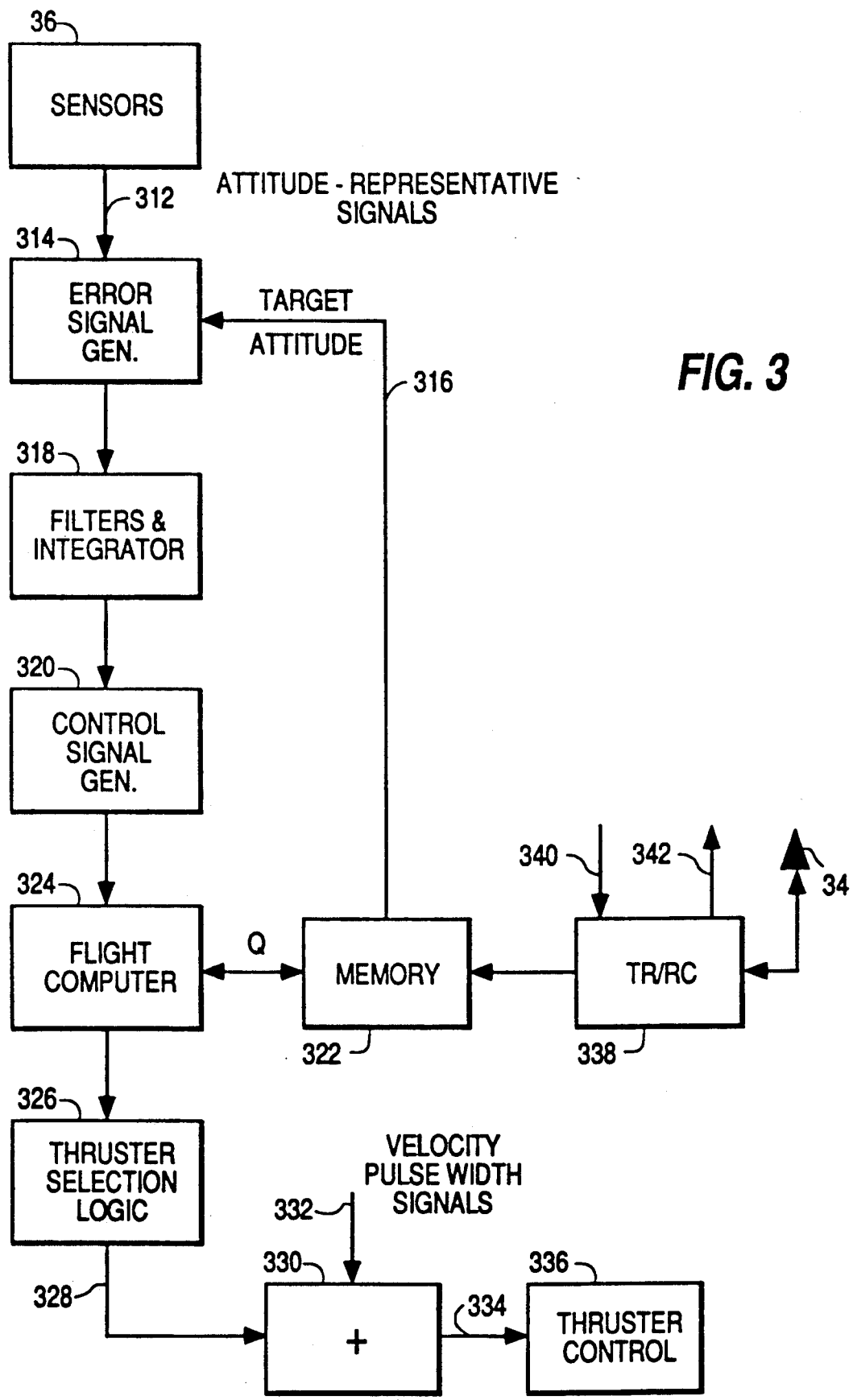
FIG. 3 is a simplified block diagram of an attitude control system according to the invention which may be used in the arrangement of FIG. 2.

FIG. 3 is a simplified block diagram of an attitude control system according to the invention which may be used in the arrangement of FIG. 2. Elements of FIG. 3 corresponding to those of FIG. 1 are designated by like reference numerals. In FIG. 3, sensors 36 generate signals representative of the 3-axis attitude of the spacecraft on a data path 312. The attitude representative signals are applied to an error signal generator illustrated as block 314, which also receives target attitude information over a data path 316 from a portion of a memory illustrated as 322. Memory 322 may be a ROM, or a RAM which can be updated with new information as conditions change. Error signal generator 314 compares the actual and target attitudes, and generates error signals, which are filtered and integrated in a block 318 to reduce noise. The filtered signals produced by block 318 are applied to a control signal generator illustrated as a block 320. Control signal generator 320 sums signals proportional to the error signal, its integral and its derivative, to form PID (proportional, integral, derivative) torque demand signals in the form of a $T_d$ vector. Spacecraft control loops using PID controllers are described, for example, in U.S. Pat. No. 5,025,381, issued Jun. 18, 1991 in the name of Goodzeit et al. The $T_d$ vector signals are applied to a portion, illustrated as 324, of the flight computer. The portion of the flight computer illustrated as 324 receives a Q vector from memory 322, and processes the signals together with the $T_d$ vector as described below.

The Q vector or matrix may be considered to be information related to the torques which can be generated by the available thrusters, taken in complementary pairs, where the thruster complementary pairs are selected as those pairs which generate approximately equal and opposite thrusts relative to the center of mass or center of gravity of the spacecraft. Those skilled in the art realize that the center of mass may change location due to depletion or unexpected distributions of fluids or consumables. Such a change will also change the moment arm through which the thruster acts, which affects the torque. Also, a thruster may experience a change in thrust as a result of aging or misadventure. A pulse-width to torque transformation matrix c has columns which represent the respective thruster torques about each axis. The Q matrix is a weighted pseudo inverse of the torque matrix C. By loading the Q matrix instead of the torque matrix C, the flight computer is relieved of the need to perform the inverse computation from C. One Q matrix is required for each operating mode tabulated in FIG. 1.

Memory 322 of FIG. 3 may be preloaded with 14 Q matrices, one for each of the A-N modes of FIG. 1. Alternatively, or additionally, other Q matrices may be uploaded from an Earth station by means of a data link including antenna 34 and transmit-receive (TR/RC) block 338 for storage in memory 322. Transmit-receive block 336 also includes other inputs and outputs, illustrated as 340 and 342, by which telemetry signals and sensor data may be returned to the Earth station, and commands and associated data may be supplied to the spacecraft.

The appropriate Q matrix (one of A-N in the example) is uplinked or accessed from memory pursuant to instructions from the ground station, based upon which thrusters are operable. The decision could also be made autonomously if the spacecraft includes self-monitoring. Flight computer 324 of FIG. 3 calculates pulse widths $\Delta_p$ from the selected Q matrix and the $T_d$ vector according to the equation $$\Delta_p = \tau_p Q T_d \quad (3)$$

where $\tau_p$ is a scalar equal to the thruster control cycle time (control repetition rate).

Q is a weighted pseudo inverse of the torque matrix C, precalculated as $$Q = WC'(CWC')^{-1} \quad (4)$$

where W is a weighting matrix, usually diagonal, that gives preference to selected thruster pairs, and C' is the transpose (interchange of rows and columns) of the C matrix. The various weighting matrices W may give preference to different thruster pairs, or if there are no failures, no thruster pairs may be preferred. The calculation of Q from W and c is computation intensive, and the computation is offloaded from the flight computer by storing the Q matrix in memory rather than the C matrix.

Taking the structure of FIG. 2 as an example, the 12 thrusters are arranged in pairs which provide approximately equal and opposite thrusts about the center of mass. The six complementary pairs are (1,3), (2,4), (5,7), (6,8), (9,11) and (10,12). The W matrix for this configuration is a diagonal 6×6 matrix.

$$W = \begin{bmatrix} W_1 & 0 & 0 & 0 & 0 & 0 \\ 0 & W_2 & 0 & 0 & 0 & 0 \\ 0 & 0 & W_3 & 0 & 0 & 0 \\ 0 & 0 & 0 & W_4 & 0 & 0 \\ 0 & 0 & 0 & 0 & W_5 & 0 \\ 0 & 0 & 0 & 0 & 0 & W_6 \end{bmatrix} \quad (5)$$

When $W_1=1$, this implies thruster pair 1,3 is selected and $W_1=0$ implies that 1,3 are not selected. A small number, such as $10^{-5}$, indicates that the thruster is not preferred. The same is true for other thruster pairs. For example, consider mode A of FIG. 1, in which none of the thrusters on the West face are selected. This mode may be used when acceleration (or force) due to West face thrusters is not desired, so as to induce acceleration in a favorable direction (i.e. only from East face thrusters). In mode A, $W_5$ and $W_6$ of W are set equal to zero. In the A mode $W_3$ and $W_4$ are much smaller than $W_1$ and $W_2$ because thrusters 1-4 are ordinarily preferred for yaw control over thrusters 5-8 when doing N-S stationkeeping.

$$W = \begin{bmatrix} 1 & 0 & 0 & 0 & 0 & 0 \\ 0 & 1 & 0 & 0 & 0 & 0 \\ 0 & 0 & 10^{-5} & 0 & 0 & 0 \\ 0 & 0 & 0 & 10^{-5} & 0 & 0 \\ 0 & 0 & 0 & 0 & 0 & 0 \\ 0 & 0 & 0 & 0 & 0 & 0 \end{bmatrix} \quad (6)$$

For the described example the C matrix is of the form $$C = \begin{bmatrix} T_{1x} & T_{2x} & T_{5x} & T_{6x} & T_{9x} & T_{10x} \\ T_{1y} & T_{2y} & T_{5y} & T_{6y} & T_{9y} & T_{10y} \\ T_{1z} & T_{2z} & T_{5z} & T_{6z} & T_{9z} & T_{10z} \end{bmatrix} \quad (7)$$

where $T_{1x}$, $T_{1y}$, $T_{1z}$ represent the maximum torques which can be produced by thruster 1 about the x, y and z axes, respectively. Similarly, $T_{2x}$, $T_{2y}$, and $T_{2z}$ represent the maximum torques which can be produced by thruster 2 about the x, y and z axes. Since the thrusters are handled in complementary pairs, the maximum thrust of a thruster complementary to those listed in equation (6) is the same as that listed, but with a negative sign, i.e. the torque of thruster 3 is represented by a negative value of $T_1$.

There are usually more than three complementary pairs of thrusters, so the C matrix has a rank of 3 in that there are more unknowns than equations. This means that there is no unique solution. The weighting matrix is used to bias the solution toward the desired solution.

By substituting equations (6) and (7) into equation 4, Q takes the form $$Q = \begin{bmatrix} x & x & x \\ x & x & x \\ x & x & x \\ x & x & x \\ 0 & 0 & 0 \\ 0 & 0 & 0 \end{bmatrix} \quad (8)$$

where x represents a non-zero value. Each of the six rows in the Q matrix of equation (8) represents a selected thruster pair.

The three-axis torque demand $T_d$ vector applied to flight computer 324 of FIG. 3 is a 3-element column vector $$T_d = \begin{bmatrix} T_x \\ T_y \\ T_z \end{bmatrix} \quad (9)$$

The calculation of pulse width $\Delta_p$ by flight computer 324 is performed according to equation (3), by substitution of equations (8) and (9), $$\Delta_p = \tau_p \begin{bmatrix} x & x & x \\ x & x & x \\ x & x & x \\ x & x & x \\ o & o & o \\ o & o & o \end{bmatrix} \begin{bmatrix} T_x \\ T_y \\ T_z \end{bmatrix} \quad (10)$$

from which $\Delta_p$ for each thruster is calculated as $$\Delta_p = \begin{bmatrix} \Delta_p(1) \\ \Delta_p(2) \\ \Delta_p(3) \\ \Delta_p(4) \\ \Delta_p(5) \\ \Delta_p(6) \end{bmatrix} \quad (11)$$

in which the magnitude of each $\Delta_p$ represents the pulse width or duty cycle by which one thruster of a pair is to be energized, and the sign (+or−) of each element $\Delta_p$ determines the direction of the torque, and consequently identifies that thruster of each pair which should be energized. The calculation represented by equations (10) and (11) is simple by comparison with the calculations of equation (4).

In FIG. 3, the calculated $\Delta_p$ information is applied from flight computer 324 to thruster selection logic illustrated as a block 326, which routes the pulse width command information toward the correct thruster in accordance with the sign, to generate attitude correcting torques. FIG. 4 tabulates the operation of the thruster selection logic. In FIG. 4, the first column identifies the thruster pair, and the second column lists $\Delta_p$, the pulsewidth or duty cycle represented by the magnitude of the $\Delta_p$ information produced by flight computer 324. The sign (+or−) of the $\Delta_p$ information is tabulated in column 3, and the fourth column indicates the attitude component of the control signal $\Delta_c$ to be applied to the selected thruster. For example, if $\Delta_p(1)$ calculated for thruster pair 1,2 has a value of +0.4, the corresponding value of $\Delta_c(1)$ equals $\Delta_p(1)$, and pulse control magnitude of 0.4 is applied to thruster 1. On the other hand, if $\Delta_p(1)$ had a value of −0.4, the thruster selection logic would produce $\Delta_c(3) = -[\Delta_p(1)] = \Delta_p(1)$, which is the same value of 0.4, but for application to thruster 3.

If a stationkeeping maneuver is desired in conjunction with attitude control acceleration must be provided as well as torque, and the appropriate thruster(s), and the pulse widths appropriate to the desired thrusters are calculated in accordance with the prior art. The resulting velocity-representative pulse width or duty cycle signals are applied over a path 332 to an adder 330, together with the selected information from logic 326. The velocity and torque pulse width signals assigned to each thruster are added together to form a thruster drive control signal for each thruster, and the thruster drive control signals are applied to the corresponding thrusters 334.

The thrust duration is typically truncated if below a duration such as 16 msec. Thus, if the calculations indicate that a non-preferred thruster is to be pulsed for a shorter duration, its contribution is deemed to be insignificant, and that thruster is not operated at all.

Other embodiments of the invention will be apparent to those skilled in the art. For example, if the thrusters are throttleable, a throttle value signal may be substituted for the pulse-width representative signal. The above description assumes ON-logic pulsing of the thrusters, but OFF-pulsing logic may also be used, if a subtractor is used instead of adder 330 of FIG. 3, to subtract the attitude control pulsewidths from the orbit correction pulsewidths.

What is claimed is:

1. A satellite thruster control system, comprising:
   attitude sensing means for generating attitude signals representative of the 3-axis attitude of said spacecraft;
   a plurality of thrusters associated with said spacecraft, said thrusters being arranged in pairs which produce mutually opposed torques;
   memory means located on said spacecraft, said memory means being loaded with a transformation matrix, which transformation matrix is the weighted pseudo inverse of the torque matrix, said torque matrix represents the maximum torque achievable by each of said thruster pairs, and its direction relative to said 3 axes;
   error signal generating means located on said spacecraft, and coupled to said attitude sensing means, for receiving said attitude signals, and for comparing said 3-axis attitude with a target attitude to generate error signals representative of the deviation of said 3-axis attitude from said target attitude;
   attitude control means located on said spacecraft, and coupled to said error signal generating means, for converting said error signals into torque demand signals in the form of a vector representative of the 3-axis torques required for moving said 3-axis attitude toward said target attitude;
   thruster control means located on said spacecraft, and coupled and to said attitude control means for multiplying said torque demand signals by said transformation matrix for generating a matrix of pulse width signals, the magnitudes of each of said pulse width signals of said matrix being proportional to the pulse width to be applied to one thruster of a pair of said thrusters producing mutually opposed thrust relative to said 3 axes, and the sign of each of said pulse width signals being representative to that one of said thrusters of each said pair which is to be energized in response to one of said pulse width signals; and
   pulse distribution logic means located on said spacecraft, and coupled to said thrusters and to said thruster control means for distributing each of said pulse width signals to one thruster of a corresponding one of said pairs of thrusters in accordance with said sign.

2. A system according to claim 1, wherein said thruster control means further comprises means for multiplying said matrix of pulse width signals by a scalar representing the control cycle time, for making said pulse width signals representative of the pulse widths.

3. A system according to claim 1, further comprising adding means coupled to said pulse distribution logic means for adding to said pulse width signals additional signals representative of pulse width required for stationkeeping.

4. A system according to claim 1, further comprising communication means coupled to said memory means, and adapted for coupling one or more additional transformation matrices to said memory means for loading therein.

5. A system according to claim 4, wherein said communication means comprises an antenna.

6. A method for controlling at least the attitude of a spacecraft fitted with a plurality of thrusters arranged in complementary pairs, comprising steps of:

aboard said spacecraft, loading into memory a transformation matrix Q, said transformation matrix being the weighted pseudo inverse of a torque matrix C, calculated as $$Q = WC'(CWC')^{-1}$$

where C' is the transpose of the C matrix, W is a weighting matrix that establishes the preference for certain thruster pairs, and C is a matrix relating to the maximum torques available from each said thruster pair relative to three orthogonal axes;

generating attitude signals representative of the 3-axis attitude of said spacecraft;

comparing said 3-axis attitude represented by said attitude signals with a target attitude, to generate error signals representative of the deviation of said 3-axis attitude from said target attitude;

converting said error signals into a torque demand vector signal representative of the 3-axis torques required for moving said 3-axis attitude toward said target attitude;

aboard said spacecraft, retrieving said transformation matrix from memory;

aboard said spacecraft, multiplying said torque demand vector signal by said transformation matrix for generating a vector comprising pulse width signals, the magnitude of each of said pulse width signals being proportional to the pulse width to be applied to one thruster of one of said complementary pairs, and the sign of each of said pulse width signals identifying that thruster of said pair which is to be energized in response to one of said pulse width signals; and aboard said spacecraft, distributing one of said pulse width signals to each of said thruster pairs, and within each said thruster pair, selecting one thruster of said pair of thrusters in accordance with the sign of said one pulse width signal, and controlling said selected one of said pair with the magnitude of said one pulse width signal.

7. A method according to claim 6, further comprising the step of summing at least one of said pulse width signals with further pulse width representative signals representative of linear acceleration of said spacecraft.

* * * * *